US007959284B2

United States Patent
Lai

(10) Patent No.: US 7,959,284 B2
(45) Date of Patent: Jun. 14, 2011

(54) METHOD OF MAKING HIGH PRECISION OPTICS HAVING A WAVEFRONT PROFILE

(76) Inventor: Shui T. Lai, Encinitas, CA (US)

( * ) Notice: Subject to any disclaimer, the term of this patent is extended or adjusted under 35 U.S.C. 154(b) by 0 days.

(21) Appl. No.: 11/782,912

(22) Filed: Jul. 25, 2007

(65) Prior Publication Data

US 2008/0037135 A1    Feb. 14, 2008

Related U.S. Application Data

(60) Provisional application No. 60/820,340, filed on Jul. 25, 2006, provisional application No. 60/820,483, filed on Jul. 26, 2006.

(51) Int. Cl.
*G02C 7/02* (2006.01)
*G02B 3/00* (2006.01)
(52) U.S. Cl. ............... 351/177; 351/159; 359/642
(58) Field of Classification Search ............. 359/642, 359/637, 16
See application file for complete search history.

(56) References Cited

U.S. PATENT DOCUMENTS

| | | |
|---|---|---|
| 2,277,122 A | 3/1942 | Lowry |
| 3,067,647 A | 12/1962 | Sato |
| 3,634,003 A | 1/1972 | Guyton |
| 3,639,042 A | 2/1972 | Grolman |
| 3,664,631 A | 5/1972 | Guyton |
| 3,669,530 A | 6/1972 | Guyton |
| 3,718,386 A | 2/1973 | Lynn et al. |
| 3,822,932 A | 7/1974 | Humphrey |
| 3,874,774 A | 4/1975 | Humphrey |
| 3,905,688 A | 9/1975 | Decker et al. |
| 3,927,933 A | 12/1975 | Humphrey |
| 3,936,163 A | 2/1976 | Toth |
| 3,944,347 A | 3/1976 | Barkdoll et al. |
| 3,947,097 A | 3/1976 | Humphrey |
| 3,969,020 A | 7/1976 | Lynn et al. |
| 3,973,837 A | 8/1976 | Page |
| 4,015,899 A | 4/1977 | Humphrey |
| 4,070,115 A | 1/1978 | Humphrey |

(Continued)

FOREIGN PATENT DOCUMENTS

EP    1630602 A2    3/2006

(Continued)

OTHER PUBLICATIONS

PCT Notification Concerning Transmittal of International Preliminary Report on Patentability (Chapter I of the Patent Cooperation Treaty), for PCT Application No. PCT/US2007/074335, paper dated Feb. 5, 2009, 9 pages.

(Continued)

*Primary Examiner* — Jordan M. Schwartz
(74) *Attorney, Agent, or Firm* — SF Bay Area Patents, LLC; Andrew V. Smith

(57) ABSTRACT

A method of generating a high precision optical surface profile includes obtaining a high precision optical surface profile which contains information of the optical path difference map of the profile. A substrate material has a known index of refraction, Ns, while a cover material has an index Nc that is more closely matched to the index Ns of the substrate material than the index of air Nair to Ns. An exaggerated surface profile is cut that is proportionally expanded from the high precision profile by a factor: (Ns−Nair) divided by (Ns−Nc). The cut surface profile is covered with the cover material.

36 Claims, 2 Drawing Sheets

U.S. PATENT DOCUMENTS

| | | | |
|---|---|---|---|
| 4,105,302 A | 8/1978 | Tate, Jr. | |
| 4,105,303 A | 8/1978 | Guyton | |
| 4,113,363 A | 9/1978 | Humphrey | |
| 4,166,255 A | 8/1979 | Graham | |
| 4,192,582 A | 3/1980 | Aoki et al. | |
| 4,385,813 A | 5/1983 | Klein et al. | |
| 4,395,097 A | 7/1983 | Mohrman | |
| 4,396,258 A | 8/1983 | Hazard | |
| 4,407,571 A | 10/1983 | August et al. | |
| 4,426,140 A | 1/1984 | Stephens | |
| 4,465,348 A | 8/1984 | Lang et al. | |
| 4,679,921 A | 7/1987 | Yamada | |
| 5,420,651 A | 5/1995 | Kamppeter | |
| 5,434,630 A | 7/1995 | Bransome | |
| 5,512,965 A | 4/1996 | Snook | |
| 5,549,632 A | 8/1996 | Lai | |
| 5,596,378 A | 1/1997 | Kelman | |
| 5,617,157 A | 4/1997 | Shalon et al. | |
| 5,662,706 A | 9/1997 | Legerton et al. | |
| 5,844,660 A | 12/1998 | Uchida et al. | |
| 5,895,422 A * | 4/1999 | Hauber | 623/6.31 |
| 5,984,916 A | 11/1999 | Lai | |
| 5,993,438 A | 11/1999 | Juhasz et al. | |
| 6,033,740 A | 3/2000 | Oelbrandt et al. | |
| 6,126,731 A | 10/2000 | Kemeny et al. | |
| 6,149,272 A | 11/2000 | Bergner et al. | |
| 6,210,401 B1 | 4/2001 | Lai | |
| 6,325,513 B1 | 12/2001 | Bergner et al. | |
| 6,325,792 B1 | 12/2001 | Swinger et al. | |
| 6,450,642 B1 | 9/2002 | Jethmalani et al. | |
| 6,511,180 B2 | 1/2003 | Guirao et al. | |
| 6,527,716 B1 | 3/2003 | Eppstein | |
| 6,676,653 B2 | 1/2004 | Juhasz et al. | |
| 6,682,195 B2 | 1/2004 | Dreher | |
| 6,706,036 B2 | 3/2004 | Lai | |
| 6,712,466 B2 | 3/2004 | Dreher | |
| 6,746,121 B2 | 6/2004 | Ross et al. | |
| 6,761,453 B2 | 7/2004 | Wilson | |
| 6,761,454 B2 | 7/2004 | Lai et al. | |
| 6,781,681 B2 | 8/2004 | Horwitz | |
| 6,813,082 B2 | 11/2004 | Bruns | |
| 6,836,371 B2 | 12/2004 | Lai et al. | |
| 6,840,619 B2 | 1/2005 | Dreher | |
| 6,934,088 B2 | 8/2005 | Lai et al. | |
| 6,942,339 B2 | 9/2005 | Dreher | |
| 6,976,641 B2 | 12/2005 | Lai et al. | |
| 6,989,008 B2 | 1/2006 | Payman | |
| 6,989,938 B2 | 1/2006 | Bruns | |
| 7,021,764 B2 | 4/2006 | Dreher | |
| 7,034,949 B2 | 4/2006 | Horwitz | |
| 7,114,808 B2 | 10/2006 | Lai et al. | |
| 7,188,950 B2 | 3/2007 | Dreher et al. | |
| 7,216,984 B2 | 5/2007 | Hosoi | |
| 7,217,375 B2 | 5/2007 | Lai | |
| 7,220,255 B2 | 5/2007 | Lai | |
| 7,234,810 B2 | 6/2007 | Warden et al. | |
| 7,246,906 B2 | 7/2007 | Mihashi et al. | |
| 7,249,847 B2 | 7/2007 | Dreher | |
| 7,286,295 B1 * | 10/2007 | Sweatt et al. | 359/619 |
| 7,329,001 B2 | 2/2008 | Bernashid et al. | |
| 2003/0003295 A1 | 1/2003 | Dreher et al. | |
| 2003/0013339 A1 | 1/2003 | Pan | |
| 2003/0053027 A1 | 3/2003 | Sarver | |
| 2003/0095889 A1 | 5/2003 | Gottuso | |
| 2003/0143391 A1 | 7/2003 | Lai | |
| 2004/0160576 A1 | 8/2004 | Lai et al. | |
| 2004/0189935 A1 | 9/2004 | Warden et al. | |
| 2004/0235974 A1 | 11/2004 | Lai | |
| 2004/0243112 A1 | 12/2004 | Bendett et al. | |
| 2004/0267283 A1 | 12/2004 | Mavor et al. | |
| 2005/0046957 A1 | 3/2005 | Lai et al. | |
| 2005/0104240 A1 | 5/2005 | Jethmalani et al. | |
| 2005/0105044 A1 | 5/2005 | Warden et al. | |
| 2005/0174535 A1 | 8/2005 | Lai et al. | |
| 2005/0200809 A1 | 9/2005 | Dreher et al. | |
| 2005/0225725 A1 | 10/2005 | Warden et al. | |
| 2005/0259221 A1 * | 11/2005 | Marmo | 351/160 R |
| 2005/0260388 A1 | 11/2005 | Lai | |
| 2006/0007397 A1 | 1/2006 | Lai | |
| 2006/0017990 A1 * | 1/2006 | Platt et al. | 359/16 |
| 2006/0050228 A1 | 3/2006 | Lai et al. | |
| 2006/0052547 A1 | 3/2006 | Jethmalani et al. | |
| 2006/0119792 A1 | 6/2006 | Dreher | |
| 2007/0081126 A1 * | 4/2007 | Blum et al. | 351/159 |
| 2007/0153232 A1 | 7/2007 | Warden et al. | |
| 2007/0195264 A1 | 8/2007 | Lai | |
| 2007/0208363 A1 | 9/2007 | Lai | |
| 2007/0258046 A1 | 11/2007 | Lai | |
| 2007/0291224 A1 | 12/2007 | Lai | |
| 2008/0037135 A1 | 2/2008 | Lai | |
| 2008/0039825 A1 | 2/2008 | Lai | |
| 2008/0212024 A1 | 9/2008 | Lai | |

FOREIGN PATENT DOCUMENTS

| | | |
|---|---|---|
| EP | 1625425 B1 | 1/2007 |
| EP | 1439946 B1 | 4/2007 |
| EP | 1535104 B1 | 4/2007 |
| WO | 02/38092 A1 | 5/2002 |
| WO | 2005/038015 A1 | 4/2005 |
| WO | 2005/062818 A2 | 7/2005 |
| WO | 2006/020605 A2 | 2/2006 |
| WO | 2007/044967 A2 | 4/2007 |
| WO | WO 2007/095596 A2 | 8/2007 |
| WO | WO 2007/095596 A3 | 8/2007 |
| WO | 2007/044967 A3 | 9/2007 |
| WO | 2007/147152 A2 | 12/2007 |
| WO | 2007/147152 A3 | 12/2007 |
| WO | WO 2008/014330 A2 | 1/2008 |
| WO | 2008/014330 A3 | 6/2008 |

OTHER PUBLICATIONS

Antonio Guirao, Ph.D. and David R. Williams, Ph.D., A Method to Predict Refractive Errors from Wave Aberration Data, Optometry and Vision Science, vol. 80, No. 1, 2003, pp. 36-42.

Jason D. Marsack, Larry N. Thibos, and Raymond A. Applegate, Metrics of optical quality derived from wave aberrations Predict visual performance, Journal of Vision, vol. 4, 2004, pp. 322-328.

Xu Cheng, Arthur Bradley, and Larry N. Thibos, Predicting subjective judgment of best focus with objective image quality metrics, Journal of Vision, vol. 4, 2004, pp. 310-321.

Internet printout: Tisseel VH [Fibrin Sealant], Retrieved from URL: http://www.baxter.com/products/biopharmaceuticals/biosurgery/sub/tisseel.html.

Tisseel VH [Fibrin Sealant] product information, Retrieved from URL: http://www.baxter.com/products/biopharmaceuticals/downloads/Tisseel_PI.pdf.

Laser In situ Keratomileusis (LASIK), Retrieved from URL: http://www.surgeryencylopedia.com/La-Pa/Laser-In-Situ-Keratomileusis-LASIK.html.

Laser Epitheial Keratomileusis (LASEK), Retrieved from URL: http://en.wikipedia.org/wiki/Photorefractive_keratectomy.

Conductive Kerotoplasty (CK), Retrieved from URL: http://www.allaboutvision.com/visionsurgery/ck_ltk_eye_surgery.htm.

PCT International Search Report and the Written Opinion of the International Searching Authority, or the Declaration, for PCT Application No. PCT/US2007/074335, dated Apr. 2, 2008, 11 pages.

* cited by examiner

METHOD OF MAKING HIGH PRECISION OPTICS HAVING A WAVEFRONT PROFILE

PRIORITY

This application claims priority to U.S. provisional patent applications Nos. 60/820,340, filed Jul. 25, 2006, and 60/820,483, filed Jul. 26, 2006, which are incorporated by reference.

BACKGROUND

Traditional methods of making an optical surface profile involve grinding and polishing. Automated polishing typically uses a turn table, which is ideal for spherically symmetric surfaces, but it can destroy small wavefront profiles.

Wavefront profiles typically comprise peaks and valleys of the order of microns as measured in optical path difference (OPD). Even if the profile can be accurately produced on an optical surface, a conventional polishing process removes up to a couple of microns of material and it will tend to erase most if not all the intended profile distribution as if they are part of the irregularity to be polished off.

With the advent of a diamond turning CNC machine, 4 and 5 axis free-form precision cutting became commercially available. Multi-axis polishing has also been developed. A disadvantage of ultra high precision CNC is its high cost.

It is desirable to provide a method of making high precision optical surfaces, including those with a high order wavefront profile, at a cost effective level.

SUMMARY OF INVENTION

A method of generating a high precision optical surface profile includes obtaining a an optical path difference (OPD) profile for correcting certain wavefront aberrations, e.g., of an eye or another optical system including a lens and electronic photodetector or human eye, and/or a light source such as a laser or ambient light. A substrate material has a known index of refraction, Ns, while a cover material has an index Nc that is more closely matched to the index Ns of the substrate material than the index of refraction of air, Nair to Ns. An exaggerated surface profile is cut that is proportionally expanded from the OPD profile by a factor: (Ns−Nair) divided by the absolute value of (Ns−Nc). The cut surface profile is covered with the cover material.

The method may include forming an optical window at the exterior surface of the cover material. The window surface may have a concave, convex, aspheric, and/or astigmatic curvature, or otherwise.

The cover material may include liquid. The cover material may be changeable from liquid form to solid form by thermal curing or a photo-polymerization curing method, or both. The method may include changing the cover material from liquid form to solid form by thermal curing and/or by a photo-polymerization curing method.

The cover material may be derived from a chemically altered structure of the substrate material. The method may include deriving the cover material from a chemically-altered structure of the substrate material.

An optical element which is specified with a high precision wavefront profile or a OPD map, may be manufactured by any of the recited methods.

An optic is also provided with an OPD profile for correcting certain wavefront aberrations. A substrate material has a known index of refraction Ns. A cover material over the substrate material has an index Nc more closely matched to the index Ns of the substrate material than the index of air Nair to Ns. A cut surface of the substrate has a profile proportionally expanded from the OPD profile by a factor (Ns−Nair) divided by the value of (Ns−Nc).

An optical window may cover the cover material, which may have concave, convex, aspheric, and/or astigmatic curvature, or otherwise. The cover material may include liquid. The cover material may be changeable from liquid form to solid form by thermal curing and/or a photo-polymerization curing method. The cover material may be derived from a chemically altered structure of the substrate material.

In general with regard to the methods and optics described herein, only the OPD value of the surface profile of an optical element is expanded by the "expansion factor" along the direction of the light ray. The dimension relating to the dimension of the surface area X and Y are not expanded.

DETAILED DESCRIPTION OF THE EMBODIMENTS

Techniques for generating a high precision optical profile without using expensive ultra high precision CNC machines are described below.

The substrate material of the optic can be any selected from commercially available optical plastics such as CR-39, polycarbonates, or other high index (1.6 or higher) plastics, or traditional glass, BK7, crown glass, fused silica, and the like.

Once the substrate material is selected, one then selects a "matching" material that has an index of refraction very closely matched with that of the selected substrate material. For example, the substrate material may be an optical grade plastic lens having an index of refraction of 1.513. One can select a "matched" material with an index of 1.538, providing an index difference of 0.025.

Figure 1:
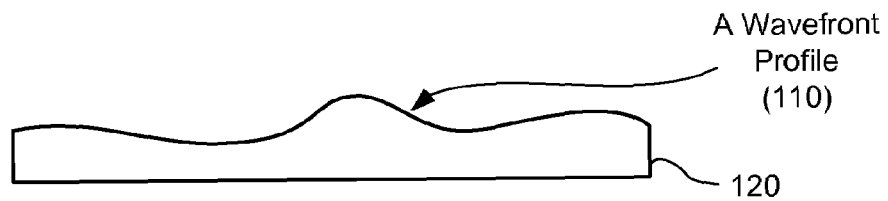
FIG. 1 schematically illustrates a substrate having a high precision optical surface profile.
Figure 2:
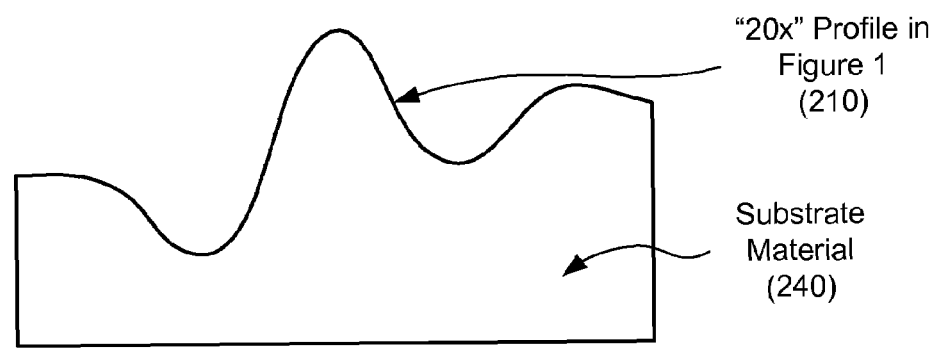
FIG. 2 schematically illustrates a substrate having an exaggerated or expanded version of the surface profile of FIG. 1.

A wavefront profile may be generated that has peaks and valleys, and for example, the peak to valley (P-V) amplitude may be required to be exactly 0.55 microns. A cross sectional view of a corresponding two-dimensional profile 110 formed in substrate 120 is illustrated in FIG. 1. Instead of using an ultra high precision CNC machine, one may use a reduced precision CNC machine with a depth cutting accuracy of 0.5 microns in accordance with an embodiment. Instead of cutting an actual profile with P-V of 0.55 microns, the substrate 240 of FIG. 2 is cut with a similar profile 210, except that P-V is now 11 microns, which is 20 times the amplitude of the P-V of the original profile formed in substrate 2 of FIG. 1. The cut profile of FIG. 2 is expanded or exaggerated by a factor of 20 compared with the high precision profile of FIG. 1.

Figure 3:
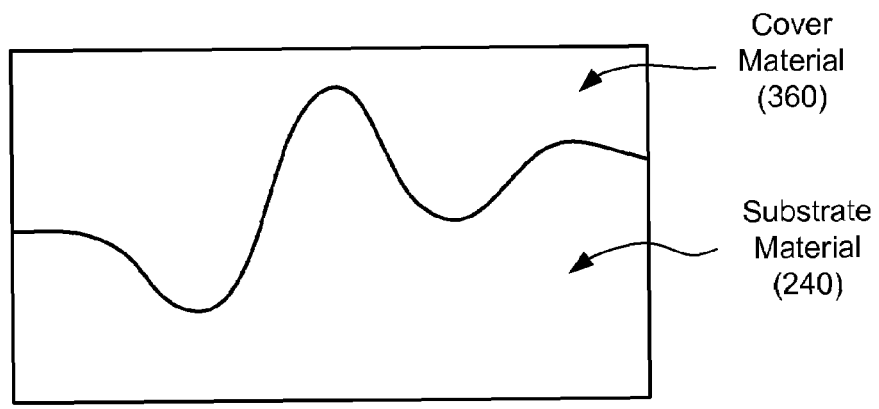
FIG. 3 schematically illustrates the substrate of FIG. 2 covered with a cover material.
Figure 4:
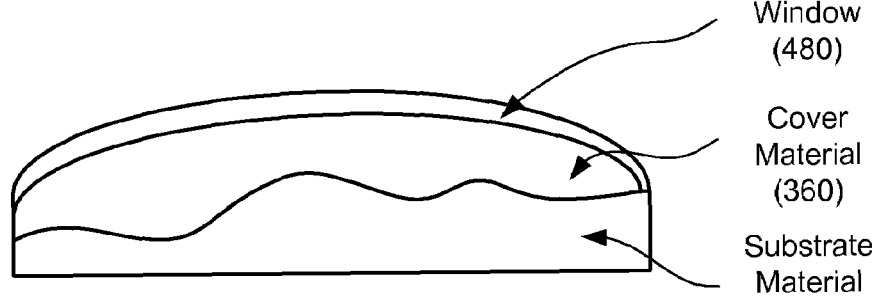
FIG. 4 schematically illustrates an optical window over the cover material of FIG. 3.

A thin layer of "matched" cover material 360 is applied over the cut profile 210, shielding it from air as illustrated at FIG. 3. An optical window 480 can be applied over the matched material 360, particularly if the material 360 is to remain in liquid form, as illustrated at FIG. 4. The window may have a front surface that is flat, concave, convex, aspheric, astigmatic and/or other selected surface profile to generate desirable optical refraction effects when light rays pass through it.

It is recognized by the present inventor that the index difference between the substrate and the "matched" cover is −0.025 in the example, which is about 20 times smaller than the difference between that of the substrate and air, which is 0.513 in this example. Advantageously, the optical path differences across the two profiles are the same: between the case that a profile with P-V of 0.55 microns from substrate to air and the case that a profile with P-V of 11 microns covered with a "matched" material to lower the index of refraction difference.

By using this index "matching" method, one may use a lower precision CNC or other surface generating methods to first generate a much less precision demanding surface and in combination of a index "matching" layer of material over the generated surface, to accomplish the generation of an ultra high precision OPD profile which would conventionally involve a higher precision and more costly CNC machine. The effect of polishing no longer has the damaging effect of erasing a substantial portion of the OPD profile, but rather, only a small fraction of the profile accuracy may be affected in the case with the expanded cut profile.

The index values used in the examples above are for illustration, and other index values can be used. The lowering of index transition from substrate to air versus substrate to "matched" material by a factor of 20 is also intended as an example, and not to be construed as a limiting factor. For the cases that involve a profile with very small OPDs, a larger expansion ratio is more beneficial, and vice versa, namely for the larger OPD wavefront profiles, a smaller magnificent factor and therefore a less "matched" index materials may be used.

The present method does not exclude the use of a higher precision CNC surface generating machines. Indeed, one may take advantage of the higher precision profile as the starting point, and generate an even higher precision profile, thereby extending the precision level of a ultra high precision CNC unit by a factor 10 or more as described.

The cover material has been described above as having an index of refraction lower than that of the substrate. One may also choose the cover index to be higher than that of the substrate in the polymer compounds. In that event, the expanded cut profile will be the inverse of the original/starting OPD profile. For example, if Nc is greater than Ns, one would first invert the OPD profile in FIG. 1, the hills become valleys and vise versa. Then the cut profile is expanded based on the inverted profile. However, the resultant effects of achieving a high precision OPD profile, and the associated benefits are substantially the same. Therefore the equation of the expansion factor for an OPD profile, (Cut surface profile)=(original surface profile)×($Ns$−$N$air)/($Ns$−$Nc$), or $OPD$(cut)=$OPD$(original)×($Ns$−$N$air)/($Ns$−$Nc$), remains valid for both cases when Ns>Nc, and Nc>Ns. The negative sign in the denominator in the case of Nc>Ns, will essentially invert the OPD profile (a negative OPD), where a negative expansion factor is applied to the original OPD profile to form an inverted profile.

Figure 5:
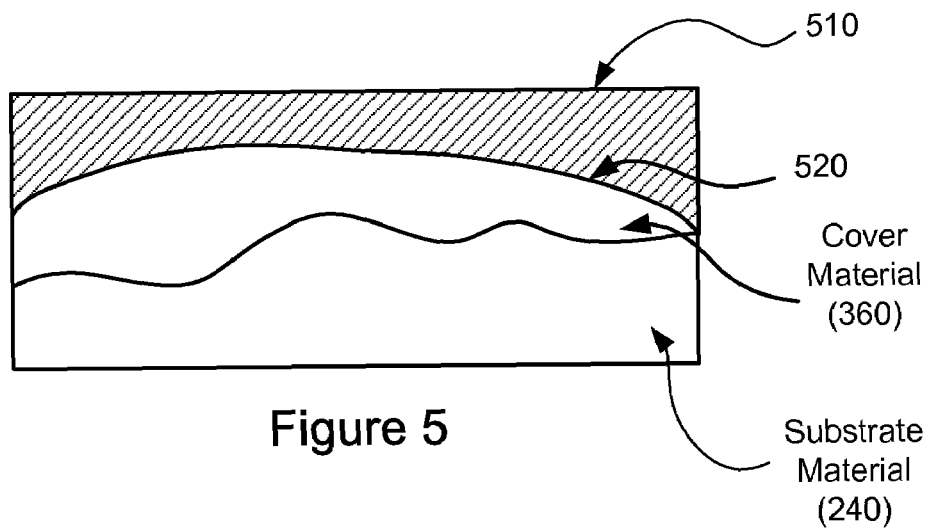
FIG. 5 schematically illustrates another embodiment including an optical window formed by an optical mold.

The "matched" material can be in liquid form. The material in liquid form can be hardened by thermal curing or methods such as photo-polymerization. In another embodiment as shown in FIG. 5, the optical window at the cover material may be formed by an optical mold 510. One surface of the mold is polished to be optically smooth, and this surface is placed in contact with the liquid of the cover material, such that a window surface is controllably formed in accordance with the shaped surface 520 of the mold. The liquid is then thermally cured, or by photo-polymerization methods and mold is then removed.

Figure 6:
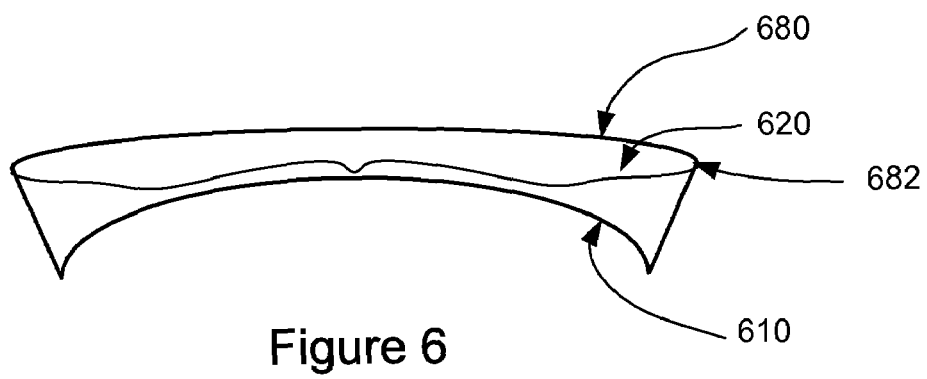
FIG. 6 schematically illustrates an embodiment including an exemplary lens having negative diopter power.

In another embodiment as shown in FIG. 6, the back surface 610 of the substrate material, the surface that is not cut to generate the OPD profile, may be cut to correct refractive errors of the eye. As illustrated in FIG. 6, the back surface 610 may be cut and polished to generate diopter power correcting single vision errors including the sphere, cylinder, and axis errors or correcting progressive addition lens (PAL) errors. In FIG. 6, the exemplar lens exhibits negative diopter power, having thicker material at the periphery than that at the center. The front surface 680 may be formed by a thin window layer 682, as illustrated in 480 in FIG. 4. The top layer 682 may be formed from the cover material as illustrated in 520 in FIG. 5 using a molding method. The cut wavefront profile surface between the substrate material and the cover material is shown here as 620. Note that the wavefront profile is formed along a curved surface to optimize the lens "thinness". The optical element so produced may be used as an ophthalmic lens in eyeglasses that incorporates wavefront profile that corrects the higher order aberrations of the eye. Methods of measuring and compensating higher order aberrations of the eye have been described in U.S. Pat. Nos. 7,188,950, 6,836,371, and 7,217,375, all of which are incorporated herein by reference.

In generating a cut surface using a CNC machine, the cut profile is typically specified by a file including a raster of point locations. Each point location contains the axial location of the cutter tip, or the cutting height. It is preferable to provide the derivative values of the cut curve to further specify a speed of change of a cutter's location. Both the point file and the derivative file are stored in computer readable media. The cutting program of the CNC machine reads the cut profile data from the storage location and controls the movement, speed and the location of the cutting tip. One or more storage media may be provided with a computer-component of a CNC machine for this purpose. In addition, program code may also be provided for programming the same processor or a different processor than that which controlled the cutting of the substrate for controlling a method of covering the cut surface profile with the cover material. For example, after the CNC cutting process, the cut substrate may be moved, shipped or otherwise transported to another processor-controlled machine for covering the cut substrate according to program code provided at that machine.

Index variation can be controlled in polymer compounds such as those used in optical plastic lenses by modifying in a part of its structure. For example, one may modify the bond types, bond angles, or the chain lengths, or by attaching various ions or atoms, or adding or subtracting polymer units or molecules to selected structures. These are just examples wherein an index of refraction of a material can be controllably altered.

One can generate the cover material from the substrate material using one or more of the mentioned methods or other known index changing method. That way, the cover and the substrate would be chemically and structurally matched and less susceptible to problems related with bonding the substrate and the cover materials together.

In the above description, the word "matched" merely indicates a "closely matched" condition, or having a small refractive index difference, and is not meant to require the indices of the materials to be "identical" or exactly the same. The indices may be one or two or three tenths different or more, or may be a hundredth, two-hundredth or three hundredth or more.

The terms wavefront profile, OPD map, and surface profile are used to describe a two dimensional X-Y distribution of optical path difference OPD, either at the surface or through the entire optical element. The OPD is analogous to a geographic contour map except the hills and valleys (Z direction) are now in the units of microns or other convenient units describing the OPD.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, as well as U.S. patent applications Nos. 60/826,043, 60/820,340, 60/804,919, Ser. Nos. 11/746,051, 11/764,160 and 11/675,079, and U.S. Pat. Nos. 7,220,255, 7,217,375, 6,761,454 and 6,836,371, also by Dr. Shui Lai, are all hereby incorporated by reference into the detailed description of the preferred embodiments as disclosing alternative embodiments and components.

What is claimed is:

1. A method of generating an optic having an optical path difference (OPD) profile for correcting wavefront aberrations, comprising:
   (a) obtaining an OPD profile for correcting certain wavefront aberrations;
   (b) selecting a substrate material with a known index of refraction, Ns;
   (c) selecting a cover material with an index Nc that is more closely matched to the index Ns of the substrate material than the index of air Nair to Ns;
   (d) cutting an exaggerated surface profile into the substrate material that is proportionally expanded from said OPD profile by a factor: (Ns−Nair) divided by the absolute value of (Ns−Nc); and
   (e) covering the cut exaggerated surface profile with the cover material.

2. The method of claim 1, further comprising covering the cover material with an optical window.

3. The method of claim 2, wherein the optical window has a concave, convex, aspheric, or astigmatic curvature, or combinations thereof.

4. The method of claim 1, wherein the cover material comprises liquid.

5. The method of claim 4, wherein the cover material is changeable from liquid form to solid form by thermal curing or a photo-polymerization curing method, or both.

6. The method of claim 5, further comprising changing the cover material from liquid form to solid form by thermal curing.

7. The method of claim 5, further comprising changing the cover material from liquid form to solid form by a photo-polymerization curing method.

8. The method of claim 1, wherein the cover material is derived from a chemically altered structure of the substrate material.

9. An optic manufactured by the method of claim 1.

10. An optic with an optical path difference (OPD) profile for correcting wavefront aberrations, comprising:
    (a) a substrate material with a known index of refraction Ns;
    (b) a cover material with an index Nc more closely matched to the index Ns of the substrate material than the index of air Nair to Ns; and
    (c) a cut surface of the substrate having a profile proportionally expanded from said OPD profile by a factor (Ns−Nair) divided by the absolute value of (Ns−Nc), wherein the cover material covers the cut surface of the substrate.

11. The optic of claim 10, further comprising an optical window covering the cover material.

12. The optic of claim 11, wherein the optical window has a concave, convex, aspheric, or astigmatic curvature, or combinations thereof.

13. The optic of claim 12, wherein the window comprises a window element over the cover material, a window surface cut and generated in the cover material, a window surface generated by an optical mold in contact with the cover material prior to curing of the cover material, or combinations thereof.

14. The optic of claim 10, wherein the cover material comprises liquid.

15. The optic of claim 14, wherein the cover material is changeable from liquid form to solid form by thermal curing or a photo-polymerization curing method, or both.

16. The optic of claim 10, wherein the cover material is derived from a chemically altered structure of the substrate material.

17. The optic of claim 10, wherein said optic comprises an ophthalmic lens, wherein the back surface of the substrate material layer is cut to generate diopter power correcting single vision refractive errors including sphere, cylinder or axis errors of the eye, or the back surface may be cut to form a progressive addition lens profile, or combinations thereof.

18. One or more computer readable media having program code embodied therein for programming a cutting machine processor to control a method of generating an optical path difference (OPD) profile for correcting wavefront aberrations, wherein the method comprises:
    (a) obtaining an OPD profile for correcting certain wavefront aberrations,
    (b) selecting a substrate material that has a known index of refraction, Ns, and
    (c) selecting a cover material that has a known index Nc that is more closely matched to the index Ns of the substrate material than the index of air Nair to Ns; and
    (d) cutting the substrate material according to an exaggerated surface profile that is proportionally expanded from the OPD profile by an expansion factor, (Ns−Nair) divided by the absolute value of (Ns−Nc), and
    (e) covering the cut surface with the cover material.

19. The one or more media of claim 18, having further program code embodied therein for programming the same or a different processor to control a method of covering the cut surface profile with the cover material.

20. The one or more media of claim 19, wherein the method further comprises covering the cover material with an optical window.

21. The one or more media of claim 20, wherein the optical window has a concave, convex, aspheric, or astigmatic curvature, or combinations thereof.

22. The one or more media of claim 19, wherein the cover material comprises liquid.

23. The one or more media claim 22, wherein the cover material is changeable from liquid form to solid form by thermal curing or a photo-polymerization curing method, or both.

24. The one or more media of claim 23, wherein the method further comprises changing the cover material from liquid form to solid form by thermal curing.

25. The one or more media of claim 23, wherein the method further comprises changing the cover material from liquid form to solid form by a photo-polymerization curing method.

26. The one or more media of claim 19, wherein the cover material is derived from a chemically altered structure of the substrate material.

27. The one or more media of claim 19, wherein the method further comprises covering the cover material with an optical window.

28. The one or more media of claim 27, wherein the optical window has a concave, convex, aspheric, or astigmatic curvature, or combinations thereof.

29. The one or more media of claim 28, wherein the window comprises a window element over the cover material, and the method further comprises cutting or otherwise generating a window surface in the cover material, or generating a window surface by an optical mold in contact with the cover material prior to curing of the cover material, or combinations thereof.

30. The one or more media of claim 19, wherein said optic comprises an ophthalmic lens, and the method further comprises cutting the back surface of the substrate material layer to generate diopter power correcting single vision refractive errors including sphere, cylinder or axis errors of the eye, or cutting the back surface to form a progressive addition lens profile, or combinations thereof.

31. An optical element for correcting wavefront aberrations, comprising:
   (a) a substrate material with a known index of refraction Ns;
   (b) a cut surface in the substrate material having an optical path difference (OPD) profile configured for correcting certain wavefront aberrations;
   (c) a cover material over the cut substrate surface, the cover material having an index Nc more closely matched to the index Ns of the substrate material than the index of air Nair to Ns; and
   (d) a window over the cover material, a window surface cut and generated in the cover material, a window surface generated by an optical mold in contact with the cover material prior to curing of the cover material, or combinations thereof, and
   (e) wherein said cut surface has a profile proportionally expanded from the OPD profile by a factor (Ns−Nair) divided by the absolute value of (Ns−Nc).

32. The optical element of claim 31, wherein the cover material comprises liquid.

33. An optical element for correcting wavefront aberrations, comprising:
   (a) a substrate material with a known index of refraction Ns;
   (b) a cut surface in the substrate material having an optical path difference (OPD) profile configured for correcting certain wavefront aberrations;
   (c) a cover material over the cut substrate surface, the cover material having an index Nc more closely matched to the index Ns of the substrate material than the index of air Nair to Ns, and
   (d) wherein the cover material comprises liquid and is changeable from liquid form to solid form by thermal curing or a photo-polymerization curing method, or both, and
   (e) wherein said cut surface has a profile proportionally expanded from the OPD profile by a factor (Ns−Nair) divided by the absolute value of (Ns−Nc).

34. The optical element of claim 31, wherein the cover material is derived from a chemically altered structure of the substrate material.

35. The optical element of claim 31, wherein the window has a concave, convex, aspheric, or astigmatic curvature, or combinations thereof.

36. The optical element of claim 31, wherein said optical element comprises an ophthalmic lens, wherein the back surface of the substrate material layer is cut to generate diopter power correcting single vision refractive errors including sphere, cylinder or axis errors of the eye, or the back surface is cut to form a progressive addition lens profile, or combinations thereof.

* * * * *